US008635371B2

(12) United States Patent
Kim et al.

(10) Patent No.: US 8,635,371 B2
(45) Date of Patent: Jan. 21, 2014

(54) METHOD AND APPARATUS FOR PROCESSING TIMESTAMP USING SIGNATURE INFORMATION ON PHYSICAL LAYER

(75) Inventors: Seung-hwan Kim, Daejeon-si (KR); Je-soo Ko, Daejeon-si (KR); June-koo Rhee, Daejeon-si (KR); Kyu-sang Lee, Seoul (KR); Chan-kyun Lee, Daejeon-si (KR); Ji-hoon Sung, Daejeon-si (KR)

(73) Assignees: Electronics and Telecommunications Research Institute, Daejeon-si (KR); Korea Advanced Institute of Science & Technology, Daejeon-si (KR)

( * ) Notice: Subject to any disclaimer, the term of this patent is extended or adjusted under 35 U.S.C. 154(b) by 1075 days.

(21) Appl. No.: 12/635,902

(22) Filed: Dec. 11, 2009

(65) Prior Publication Data

US 2010/0223399 A1      Sep. 2, 2010

(30) Foreign Application Priority Data

Feb. 27, 2009   (KR) .................. 10-2009-0016982

(51) Int. Cl.
  *G06F 15/16*     (2006.01)
(52) U.S. Cl.
  USPC ............ 709/248; 709/220; 370/248; 386/68; 386/255
(58) Field of Classification Search
  USPC .................. 709/248; 370/426; 386/68, 255
  See application file for complete search history.

(56) References Cited

U.S. PATENT DOCUMENTS

| | | | | |
|---|---|---|---|---|
| 5,420,866 | A * | 5/1995 | Wasilewski | 370/426 |
| 5,920,627 | A * | 7/1999 | Mionet et al. | 713/163 |
| 7,116,892 | B2 * | 10/2006 | Wajs | 386/255 |
| 7,200,682 | B2 | 4/2007 | Miyazaki et al. | |
| 7,636,439 | B2 | 12/2009 | Nakabayashi et al. | |
| 7,827,223 | B2 * | 11/2010 | Gressel et al. | 708/250 |
| 8,042,157 | B2 * | 10/2011 | Bennett et al. | 726/4 |
| 8,042,894 | B2 * | 10/2011 | Yearworth et al. | 347/6 |
| 8,103,869 | B2 * | 1/2012 | Balandin et al. | 713/160 |
| 2003/0152364 | A1 * | 8/2003 | Wajs | 386/68 |
| 2006/0279588 | A1 * | 12/2006 | Yearworth et al. | 347/6 |
| 2007/0103997 | A1 * | 5/2007 | Bennett et al. | 365/195 |
| 2007/0174608 | A1 * | 7/2007 | Balandin et al. | 713/155 |
| 2007/0244951 | A1 * | 10/2007 | Gressel et al. | 708/252 |
| 2009/0019501 | A1 * | 1/2009 | Saxena et al. | 725/104 |
| 2009/0304101 | A1 * | 12/2009 | LoPorto et al. | 375/260 |
| 2012/0044286 | A1 * | 2/2012 | Yearworth et al. | 347/6 |
| 2012/0057704 | A1 * | 3/2012 | Chen | 380/270 |

FOREIGN PATENT DOCUMENTS

| | | |
|---|---|---|
| JP | 2004-505500 A | 2/2004 |
| KR | 10-0448960 B1 | 9/2004 |
| KR | 10-0583234 B1 | 5/2006 |
| KR | 1020060051144 A | 5/2006 |
| KR | 1020100068142 A | 6/2010 |
| WO | 02/09351 A2 | 1/2002 |

* cited by examiner

*Primary Examiner* — Tammy Nguyen
(74) *Attorney, Agent, or Firm* — Ladas & Parry LLP (57) ABSTRACT

A method and apparatus for processing a timestamp using signature information on a physical layer is provided. The timestamp processing terminal uses a pseudo-random binary sequence to assign signature information to a message which is to be sent to another terminal, and verifies the signature information on a physical layer. The signature information is used to identify the message as a sync message. Accordingly, it is possible to precisely process the timestamp.

15 Claims, 10 Drawing Sheets

METHOD AND APPARATUS FOR PROCESSING TIMESTAMP USING SIGNATURE INFORMATION ON PHYSICAL LAYER

CROSS REFERENCE TO RELATED APPLICATION

This application claims the benefit under 35 U.S.C. §119 (a) of Korean Patent Application No. 10-2009-0016982, filed on Feb. 27, 2009, the disclosure of which is incorporated by reference in its entirety for all purposes.

BACKGROUND

1. Field

The following description relates to a network technology and, more particularly, to a synchronization technology.

2. Description of the Related Art

A synchronization process is necessary to perform synchronization of clocks between terminals interconnected across a network. This involves time-transfer protocols using timestamps, such as IEEE 1588 protocol or network time protocol (NTP).

For example, IEEE 1588 is a standard time transfer protocol that allows precise synchronization of clocks across a network. IEEE 1588 performs synchronization using a difference in reference time between two terminals and a transfer delay in packet transmission between two terminals. In this case, the IEEE 1588 protocol performs synchronization of clocks of terminals communicating with each other across a network. Accuracy within the microsecond range and convenient system management can be achieved with the protocol.

SUMMARY

Accordingly, in one aspect, there is provided a method and apparatus for processing timestamp that allows precise timestamping.

In one general aspect, there is provided a timestamp processing terminal for performing synchronization with another terminal connected to a network, including: a first timestamp processing unit configured to assign signature information to a message, which is to be sent to the terminal, using a pseudo-random binary sequence (PRBS) and to verify the signature information on a physical layer, wherein the signature information is used to identify the message as a sync message; and a second timestamp processing unit configured to identify if a message received from the terminal is a sync message by verifying on the physical layer if the PRBS is included in the message According to another aspect, there is provided a timestamp processing method for performing synchronization with another terminal connected to a network, including: generating a pseudo-random binary sequence (PRBS); assigning signature information to a message, which is to be sent to the terminal, using the PRBS, wherein the signature information is used to identify the message as a sync message; and verifying the signature information on a physical layer According to still another aspect, there is provided an information storage medium for recording a hierarchical structure of a timestamp processing terminal for performing synchronization with another terminal connected to a network, including: an application layer including a first application layer and a second application layer, wherein the first application layer is configured to generate a pseudo-random binary sequence (PRBS), to assign signature information to a message, which is to be sent to the terminal, using the PRBS, the signature information being used to identify the message as a sync message, and to transmit the message to a lower layer, and the second application layer is configured to perform synchronization if the verified PRBS is received from the lower layer; and a physical layer including a first physical layer and a second physical layer, wherein the first physical layer is configured to verify if a bitstream received from the first application layer includes the PRBS and, if the bitstream is verified as including the PRBS, to determine the bitstream as the sync message and perform timestamping, and the second physical layer is configured to identify if a message received from the terminal is a sync message by verifying if the PRBS is included in the message and to perform synchronization if the message has been identified as the sync message Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
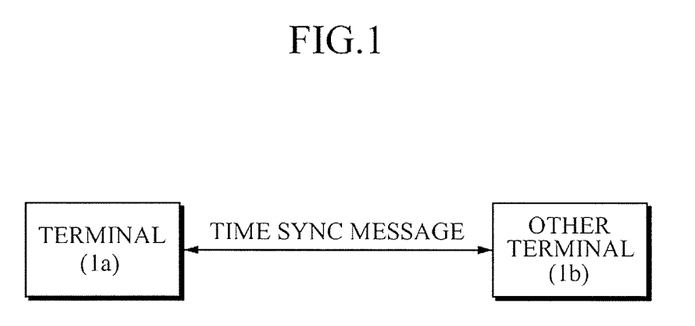
FIG. 1 is a block diagram of a time synchronization system according to an exemplary embodiment of the present invention.

FIG. 1 is a block diagram of a time synchronization system according to an exemplary embodiment of the present invention.

A timestamp processing system includes a terminal 1a and another terminal 1b across a network. The terminal 1a synchronizes clocks with the other terminal 1b. The synchronization between the terminals may be implemented, but not limited to, on a high-speed Ethernet including 40G or 100G Ethernet.

In the current example, IEEE 1588 may be used for synchronization between the terminals. IEEE 1588 is a standard for a precision clock synchronization protocol for networked measurement and control system, which allows precise synchronization of clocks across a network using a difference in reference time between two terminals and a transmission delay occurring in packet transmission between the two terminals.

There exist on the network a master device to provide a reference clock and a slave device to match its time information to the master device to perform synchronization. In FIG. 1, for example, the terminal 1a may be a master device and the other terminal 1b may be a slave device. A plurality of slave devices may be used. The master device may synchronize with the slave device using a Sync message, a FollowUp message, a Delay Request message, a Delay Response message, a Propagation Delay Request message or a Propagation Delay Response message.

Figure 2:
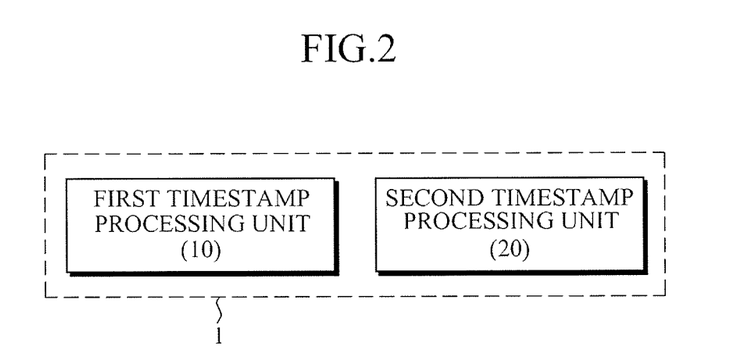
FIG. 2 is a block diagram of a timestamp processing terminal according to an exemplary embodiment of the present invention.

FIG. 2 is a block diagram of a timestamp processing terminal 1 according to an exemplary embodiment of the present invention.

The timestamp processing terminal 1 includes a first timestamp processing unit 10 as a transmitter and a second timestamp processing unit 20 as a receiver. The timestamp processing terminal 1 may be the terminal 1a or 1b in FIG. 1.

The timestamp processing terminal 1 performs timestamping on a physical layer for precise timestamping. That is, the timestamping is performed using the physical layer rather than a media access control (MAC) layer, a network layer or an application layer.

A more precise timestamping may be achieved by performing the timestamping on the physical layer. For example, timestamping on an upper layer of the MAC layer may result in inaccurate timestamping due to jitter in software, CPU access time or the like. For another example, timestamping in the MAC layer may result in inaccurate timestamping due to a delay or jitter caused by MAC access or Pause control.

In the current example, however, since timestamping is performed on the physical layer which is the lowest layer, it is possible to address the above-mentioned problems in timestamping on the other layers and to increase the precision.

Figure 3:
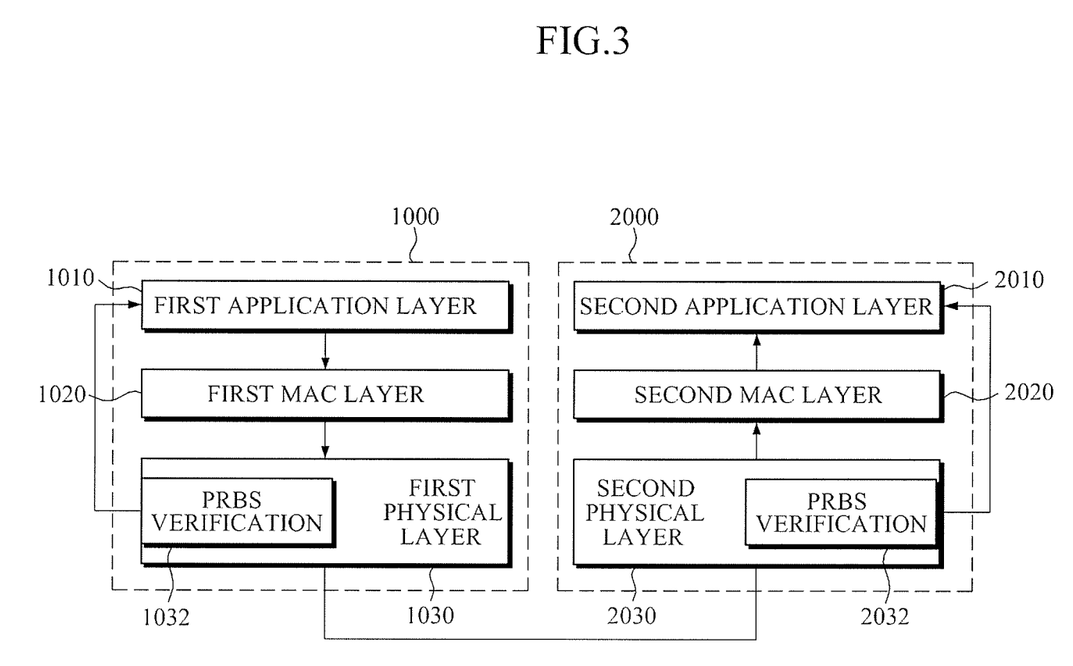
FIG. 3 is a hierarchical structure of a timestamp processing terminal according to an exemplary embodiment of the present invention.

FIG. 3 is a block diagram illustrating a hierarchical structure of a timestamp processing terminal according to an exemplary embodiment of the present invention.

The hierarchical structure of the timestamp processing terminal includes an application layer, a MAC layer, and a physical layer.

The application layer includes a first application layer 1010 in a transmitter 1000 and a second application layer 2010 in a receiver 2000. The first application layer 1010 assigns signature information to a message, which is to be transmitted to another terminal, to indicate a sync message and forwards it to a lower layer for synchronization between terminals.

The signature information is assigned to a TLV field indicating type, length and value of the sync message. The TLV field is a field that may be optionally inserted at the end of the sync message, such as IEEE 1588 message. Accordingly, a predefined type of TVL may be inserted to the type field; a length of the subsequent value, to the length field; user's desired data, to the value field. As a result, assignment of the signature information to the optional TLV field of the sync message allows for precise timestamping without modifying the existing network structure.

In one embodiment, the signature information may include a pseudo-random binary sequence (PRBS), which is not a real random binary sequence but a binary sequence which is pseudo-randomly generated.

The PRBS may be generated using Mersenne twister, prime polynomial or the like. For example, the PRBS may be generated using a linear feedback shift register (LFSR). The LFSR is a shift register whose input bit is a linear function of its previous state and whose input bit is driven by the exclusive-or (XOR) of some bits of the overall shift register value. Accordingly, simple timestamping may be provided from a PRBS algorithm using the LFSR.

The second application layer 2010 receives a PRBS, which has been verified by a second physical layer 2030, to perform synchronization.

The MAC layer includes a first MAC layer 1020 in the transmitter 1000 and a second MAC layer 2020 in the receiver 2000. The first MAC layer 1020 receives a packet from the first application layer 1010 and forwards it to a first physical layer 1030. The second MAC layer 2020 receives a packet from the second physical layer 2030 and forwards it to the second application layer 2010.

The physical layer includes the first physical layer 1030 in the transmitter 1000 and the second physical layer 2030 in the receiver 2000.

The first physical layer 1030 receives a bitstream from the first MAC layer 1020 and verifies if the bitstream includes a PRBS. If the bitstream is verified as including the PRBS, the first physical layer 1030 determines the bitstream as a sync message, stores a timestamp in a register and performs timestamping. In this case, the first physical layer 1030 may verify the PRBS using a PRBS17 pattern checker.

The second physical layer 2030 receives a message from another terminal. The second physical layer 2030 verifies if the message includes a PRBS to identify it as a sync message. If the message is identified as the sync message, the second physical layer 2030 performs timestamping.

A timestamp processing terminal and timestamp processing method according to an exemplary embodiment of the present invention will be described in detail with FIG. 3 and the subsequent drawings.

Figure 4:
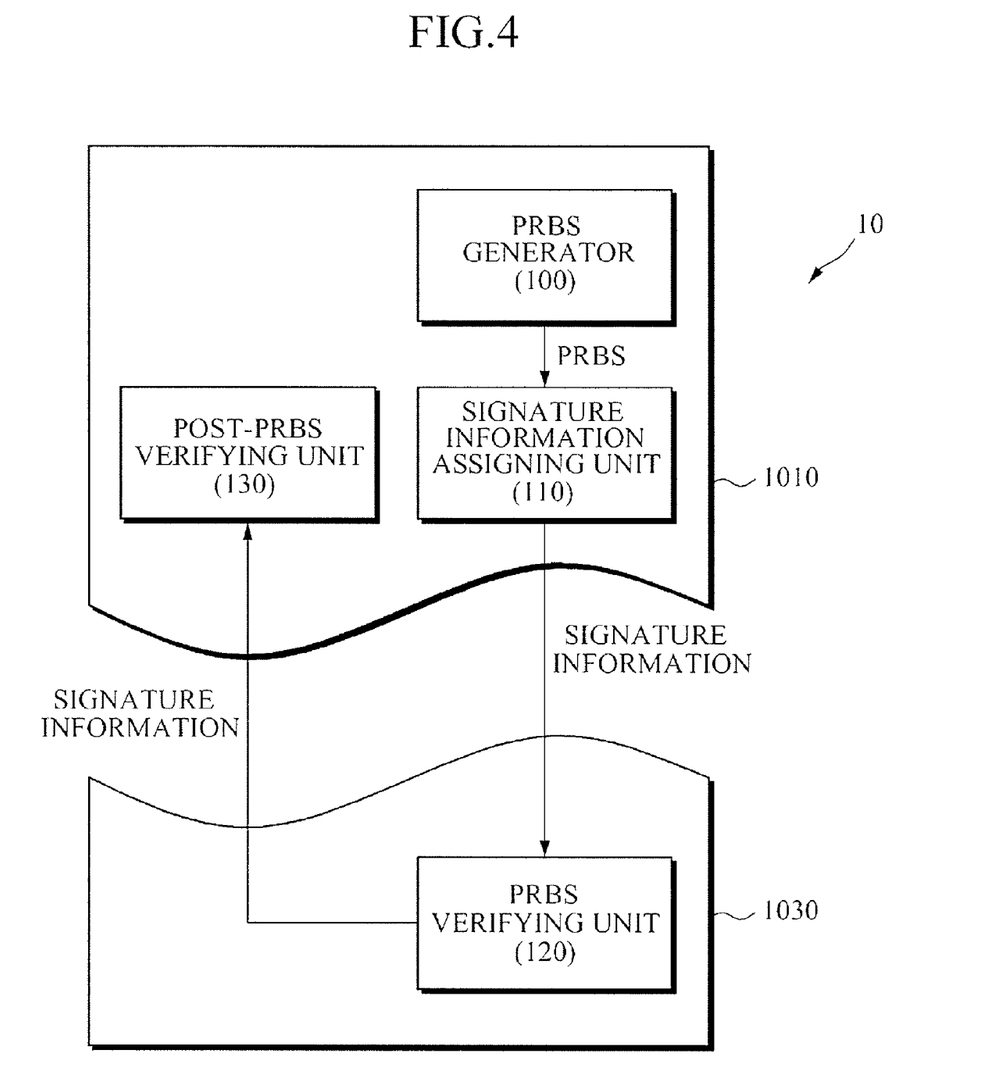
FIG. 4 is a block diagram of a first timestamp processing unit according to an exemplary embodiment of the present invention.

FIG. 4 is a block diagram illustrating a first timestamp processing unit 10 of a timestamp processing terminal according to an exemplary embodiment of the present invention. The first timestamp processing unit 10 includes a PRBS generator 100, a signature information assigning unit 110, and a PRBS verifying unit 120. It may further include a post-PRBS verifying unit 130. The PRBS generator 100, the signature information assigning unit 110, and the post-PRBS verifying unit 130 may be located on the first application layer 1010, and the PRBS verifying unit 120 may be located on the first physical layer 1030.

The PRBS generator 100 generates a PRBS. The PRBS generator 100 may output the PRBS by entering a predetermined input bit to a prime polynomial.

That is, the PRBS generator 100 may generate the PRBS by entering an input bit to a prime polynomial with reference to a mapping table where the input bit and a sequence identifier of a sync message are mapped. The input bits may be a seventeen (17)-bit sequence except redundant bits with a value of '0'. The sequence identifier may be, but not limited to, a sequence ID within a received packet. The mapping table of the input bit and the sequence identifier may be shared with a terminal on the receiver.

A shift register may be used as an example of using a prime polynomial. The shift register may be a 17-bit LFSR. For example, to generate a sync message with 16-bit sync message serial number or unique number, the PRBS generator 100 generates a 15-bit PRBS using the 17-bit LFSR. This will be described in detail with reference to FIG. 6.

The signature information assigning unit 110 generates signature information including a PRBS and assigns it to a sync message.

The signature information assigning unit 110 may assign the signature information to a TLV field indicating the type, length and value of the sync message. For example, a bitstream corresponding to the signature information may be assigned to a value field of a TLV field of a sync message, such as IEEE 1588 message. The TLV field may be optionally inserted at the end of the IEEE 1588 message.

The signature information assigning unit 110 may generate the signature information by adding the PRBS generated by the PRBS generator 100 following a predetermined input bit. For example, a 32-bit PRBS may be generated by entering a 17-bit sequence to a 17-bit LFSR to generate a 15-bit PRBS from and attaching the 15-bit PRBS following the 17-bit sequence. In this case, the 17-bit PRBS is bits which are mapped with a 16-bit serial number by a predetermined pseudo-random generating function. The remaining 15 bits corresponding to parity bits consists of the preceding serial number and a pseudo-random number which is additionally generated by the pseudo-random generating function. In this case, more parity bits may reduce by geometric progression a chance of mistaking a general data packet for a sync message. The mapping table or pseudo-random mapping function is stored on the application layer and shared with the application layer on the receiver.

The PRBS verifying unit 120 verifies on the physical layer if a bitstream received from an upper layer includes a PRBS. If the bitstream is verified as including the PRBS, the PRBS verifying unit 120 determines the bit stream as a sync message and performs timestamping.

The PRBS verifying unit 120 may verify the PRBS using the LFSR. The shift register used in the PRBS verifying unit 120 needs to use the same LFSR as that used in the PRBS generator. In this case, the PRBS verifying unit 120 may perform XOR operation on $14^{th}$ and $17^{th}$ bits output from the 17-bit LFSR, and verify the PRBS using the calculated EOR value and the output value.

The PRBS verifying unit 120 may determine a received bitstream as a sync message when bit '0' is consecutively generated fifteen times as a detected result value. For example, if a bitstream sent from an upper layer passes through a PRBS pattern checker of the PRBS verifying unit 120 within the physical layer and bit '0' is detected fifteen times as its detected result value, the PRBS verifying unit 120 determines it as a 1588 message, stores it in a timestamp register, and performs timestamping.

In another embodiment, the first timestamp processing unit 10 may further include a post-PRBS verifying unit 130 to re-verify the PRBS to reduce a detection error that may occur in the PRBS verifying unit 120. The post-PRBS verifying unit 130 verifies on the application layer if the PRBS received from the PRBS verifying unit 120 is the very one that has recently been sent to the physical layer. Accordingly, it is possible to significantly reduce the detection error.

For example, the post-PRBS verifying unit 130 receives a 17-bit input from the PRBS verifying unit 120. The post-PRBS verifying unit 130 checks if the PRBS received from the PRBS verifying unit 120 is the very one that has recently been sent. If so, the post-PRBS verifying unit 120 searches a sequence identifier with reference to a table or function stored in advance and forwards it to another terminal.

The first timestamp processing unit 10 reads a timestamping value and data stored in a specific register in an upper layer, such as the application layer, and searches the sequence identifier using the input bit-sequence identifier table used in generating the PRBS data. The sequence identifier is used by a message notifying a timestamping value of a transmit sync packet, such as a follow-up message of IEEE 1588. The follow-up message with a timestamping value added using the sequence identifier is sent to another terminal which is subject to synchronization.

Figure 5:
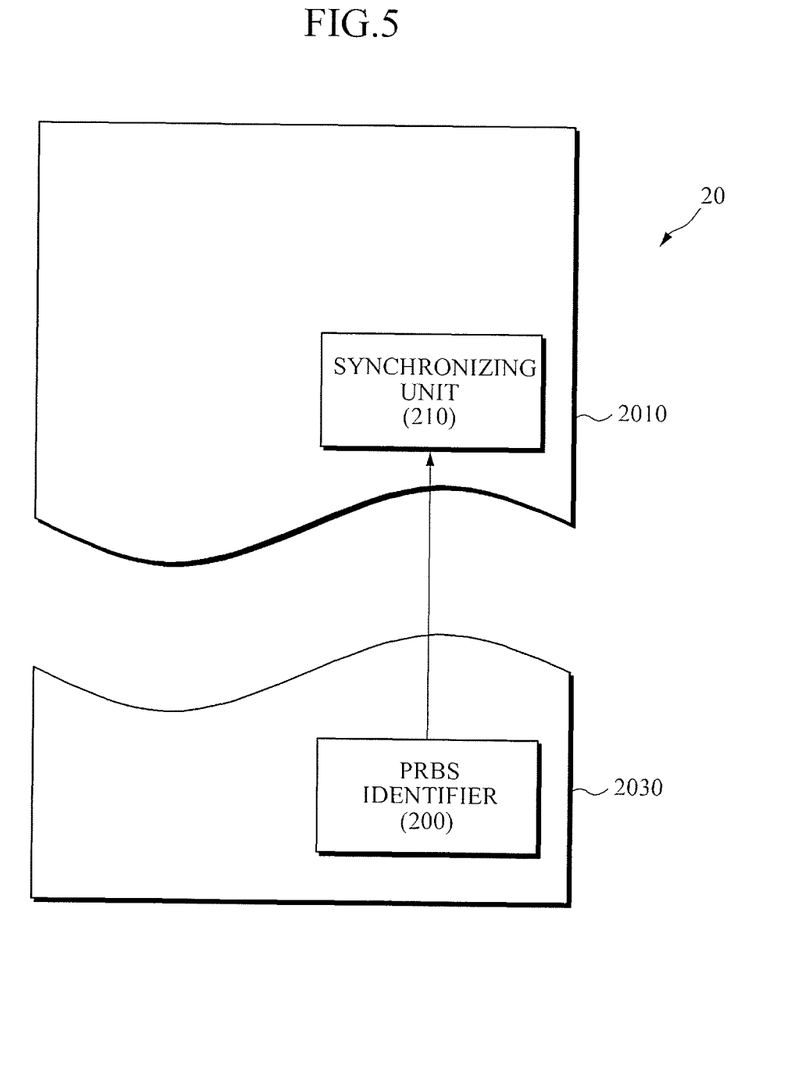
FIG. 5 is a block diagram of a second timestamp processing unit according to an exemplary embodiment of the present invention.

FIG. 5 is a block diagram of a second timestamp processing unit of a timestamp processing terminal according to an exemplary embodiment of the present invention.

The second timestamp processing unit 20 includes a PRBS identifier 200 and a synchronizing unit 210. The PRBS identifier 200 may be located in the second physical layer 2030, and the synchronizing unit 210 may be located in the second application layer 2010.

When receiving a message from another terminal, the PRBS identifier 200 verifies on the second physical layer 2030 if the message includes a PRBS to identify if the message is a sync message. The PRBS identifier 200 may include a PRBS pattern checker, which has adapted a prime polynomial, to verify the PRBS. That is, when bit '0' is continuously detected fifteen times from a bitstream passing through the second physical layer 2030 using the same pattern checker as the PRBS pattern checker in the transmitter, the bitstream is sent to the application layer. If the PRBS is verified, the PRBS identifier 200 stores the timestamp in a register.

The synchronizing unit 210 identifies a sequence identifier by using the mapping table which is shared with the application layer in the transmitter through a timestamp on the application layer.

Figure 6:
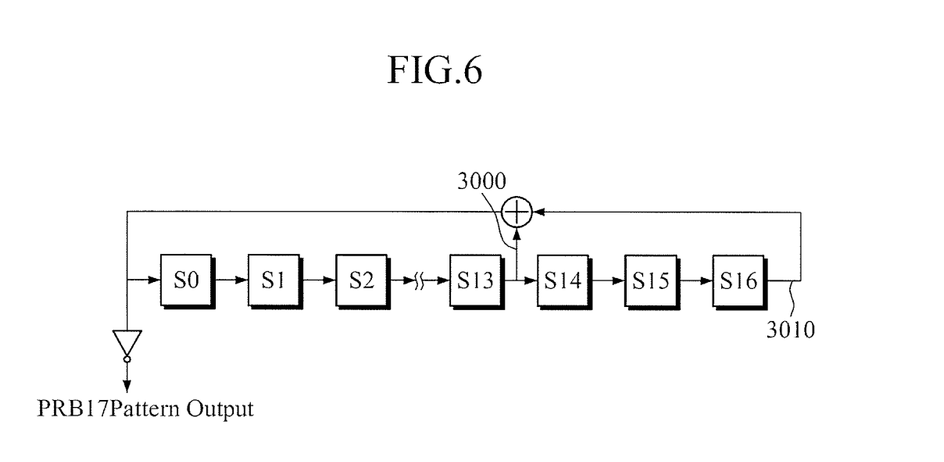
FIG. 6 illustrates generation of a pseudo-random binary sequence according to an exemplary embodiment of the present invention.

FIG. 6 illustrates generation of a pseudo-random binary sequence (PRBS) according to an exemplary embodiment of the present invention.

A 17-bit LFSR generates a PRBS. The 17-bit LFSR sequentially receives seventeen (17) bits from S0 to S16 which are mapped with a sequence identifier on the application layer, extracts fifteen (15) bits of PRBS, and outputs it as a PRBS17 pattern output. In this case, the $14^{th}$ bit 3000 and the $17^{th}$ bit 3010 may be set to tabs to generate serial numbers as many as possible. The 15-bit PRBS is added after the input 17-bit sequence, resulting in a total of 32-bit PRBS.

Figure 7:
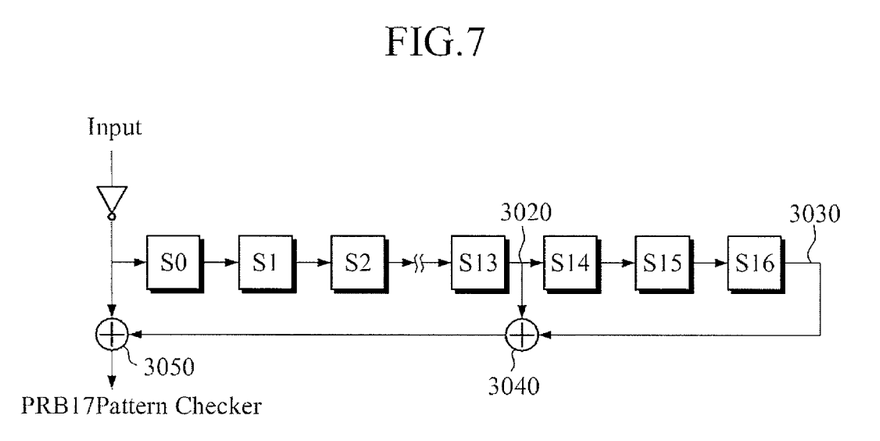
FIG. 7 illustrates checking of a pseudo-random binary sequence according to an exemplary embodiment of the present invention.

FIG. 7 illustrates checking of a pseudo-random binary sequence according to an exemplary embodiment of the present invention.

A PRBS17 pattern checker including the 17-bit LFSR checks a PRBS of a bitstream passing through the physical layer. Since the PRBS is generated through the 17-bit LFSR, the 17-bit LFSR is also used for checking. Further, the XOR operation 3040 is performed using the $17^{th}$ tab 3030 and the $14^{th}$ tab 3020 generating a maximum pattern to maximize the number of serial numbers matched to the PRBS.

At this time, the 17-bit LFSR performs XOR operation 3050 on the input from the application layer and the output from the 17-bit LFSR on the physical layer. The XOR operation is automatically performed while the 17-bit LFSR is being shifted bit by bit as input values are entered. If a 32-bit PRBS generated in the application layer passes through the 17-bit LFSR, the first seventeen bits are sequentially stored in the register and the remaining fifteen bits enter the pattern checker sequentially from the first bit, resulting in bit '0' being repeatedly generated fifteen times.

Bits following the 32-bit PRBS may accidentally meet conditions of the pattern checker so that bit '0' may be continuously detected fifteen times or more. In preparation for this situation, an exemplary timestamping device recognizes it as an IEEE 1588 message if bit '0' is produced fifteen times.

It may accidentally happen that a bit stream meets the condition of the 17-bit LFSR and bit '0' is continuously detected fifteen times. However, an exemplary timestamping device re-verifies on the application layer if the PRBS received from the 17-bit LFSR on the physical layer is the very one that has recently been sent from the application layer. Accordingly, it is possible to significantly reduce the possibility of such an error.

Figure 8:
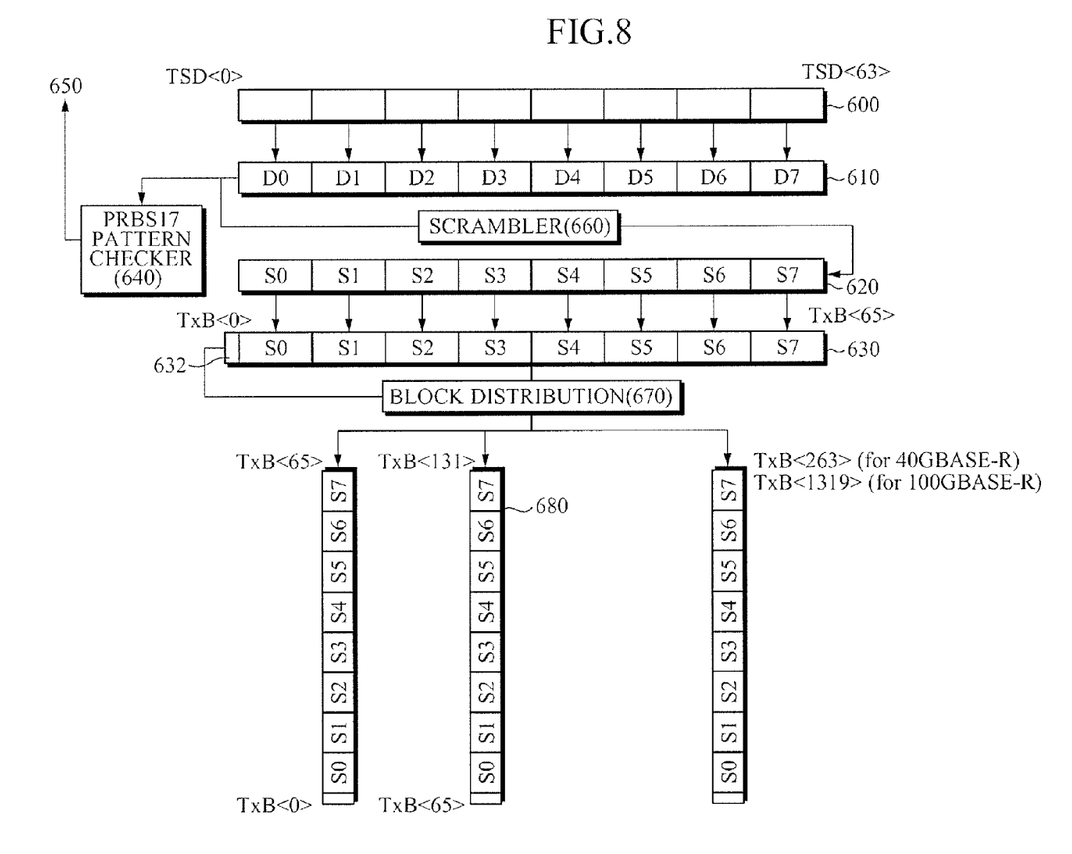
FIG. 8 illustrates a timestamp process according to an exemplary embodiment of the present invention.

FIG. 8 illustrates a timestamp process according to an exemplary embodiment of the present invention. In the current example, the timestamp process will be described with reference to the IEEE 802.3ba structure using 40/100G Ethernet.

An exemplary timestamp processing terminal receives a bitstream block 600 from an upper layer and encodes it on the physical layer to generate an encoding block 610.

The timestamp processing terminal passes the encoding block 610 through a PRBS17 pattern checker 640 to verify a PRBS of the bitstream. In this case, a PRBS verifying unit 740 may be disposed between an encoder and a scrambler on a physical coding sublayer within the physical layer. For the above-mentioned Ethernet model, since bits may be deformed when the bitstream passes through the scrambler 660, it is very difficult to detect a 32-bit PRBS having serial number information. Accordingly, for such an Ethernet model, the PRBS17 pattern checker 640 may be disposed between the encoder block 610 and the scrambler 660.

Further, the timestamp processing terminal may send the PRBS, which has been detected by the PRBS17 pattern checker 640 on the physical layer, to an application layer 650 to re-verify if the PRBS is the very one that has recently been sent by the application layer 650.

The timestamp processing terminal scrambles the encoding block 610 into a scramble block 620 using the scrambler 660. The timestamp processing terminal inserts a sync header 632 into the scramble block 620 to generate a transmit block 630. The sync header 632 may consist of '01' or '10'. A block distribution 670 on the physical layer distributes the transmit block 630 to lanes. At this time, a sync packet is sent to another terminal which is subject to synchronization.

Figure 9:
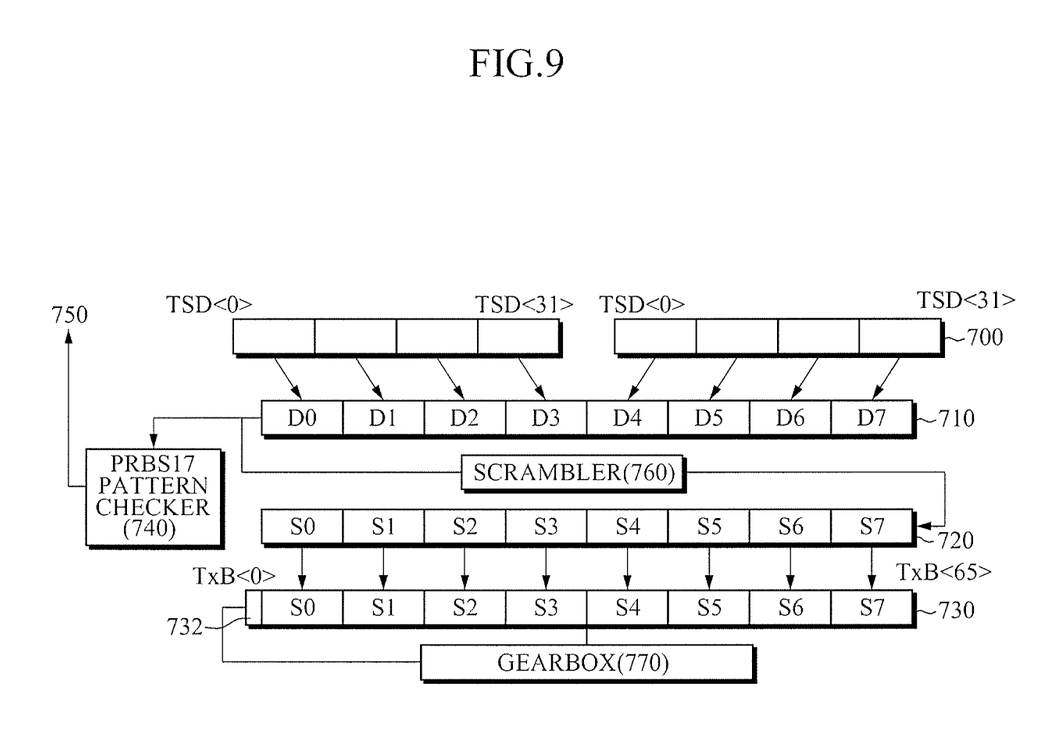
FIG. 9 illustrates a timestamp process according to another exemplary embodiment of the present invention.

FIG. 9 illustrates a timestamp process according to another exemplary embodiment of the present invention. The timestamp process will be described with reference to the IEEE 802.3 structure using 1G/10G Ethernet.

An exemplary timestamp processing terminal receives a bitstream block 700 from an upper layer and encodes it on the physical layer to generate an encoding block 710.

The timestamp processing terminal passes the encoding block 710 through a PRBS17 pattern checker 740 to verify a PRBS of the bitstream. In this case, a PRBS verifying unit 740 may be disposed between an encoder and a scrambler on a physical coding sublayer within the physical layer. For the above-mentioned Ethernet model, since bits may be deformed when the bitstream passes through the scrambler 760, it is very difficult to detect a 32-bit PRBS having serial number information. Accordingly, for such an Ethernet model, the PRBS17 pattern checker 740 may be disposed between the encoder block 710 and the scrambler 760.

Further, the timestamp processing terminal may send the PRBS, which has been detected by the PRBS17 pattern checker 740 on the physical layer, to an application layer 750 to re-verify if the PRBS is the very one that has recently been sent by the application layer 750.

The timestamp processing terminal scrambles the encoding block 710 into a scramble block 720 using the scrambler 760. The timestamp processing terminal inserts a sync header 732 into the scramble block 720 to generate a transmit block 730. The transmit block 730 is sent to a gearbox 770. As described above, it can be seen that timestamping may be applicable to IEEE 802.3ba model as well as IEEE 802.3 model. That is, timestamping may be applicable without significantly modifying the existing network structures.

Figure 10:
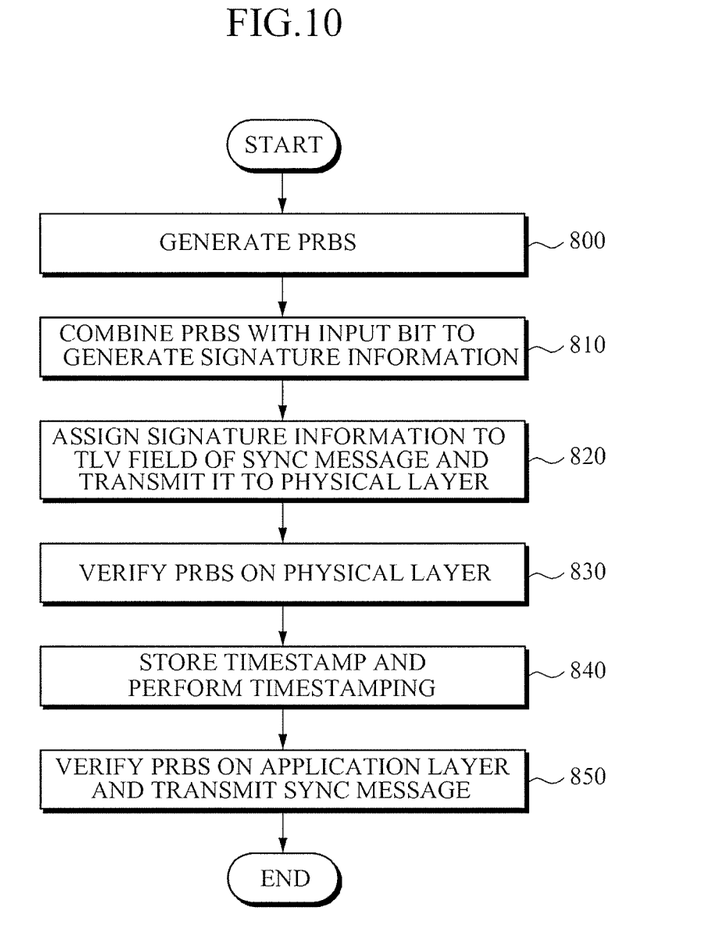
FIG. 10 is a flow chart illustrating a timestamp processing method according to an exemplary embodiment of the present invention.

FIG. 10 is a flow chart illustrating a timestamp processing method according to an exemplary embodiment of the present invention.

In operation 800, a timestamping device generates a PRBS. In operation 810, it combines the PRBS with an input bit to generate signature information.

In operation 820, the timestamping device assigns the signature information to a TLV field of a sync message and sends it to a physical layer. The operations 800, 810 and 820 are performed on an application layer.

In operation 830, the timestamping device verifies the PRBS on the physical layer. In operation 840, if the PRBS is verified, the timestamping device stores the timestamp in a register and performs timestamping. In operation 850, the timestamping device verifies the PRBS on the application layer and sends the sync message to another terminal.

As apparent from the above description, since the timestamp processing terminal performs timestamping on the physical layer, it is possible to reduce delay, jitter and uncertainties and to improve precision. Furthermore, it is possible to provide highly precise timestamping using a simple PRBS algorithm without significantly modifying the network structure.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A timestamp processing terminal for performing synchronization with another terminal connected to a network, comprising:
   a first timestamp processing unit configured to assign signature information to a message, which is to be sent to the terminal, using a pseudo-random binary sequence (PRBS) and to verify the signature information on a physical layer, wherein the signature information is used to identify the message as a sync message; and
   a second timestamp processing unit configured to identify if a message received from the terminal is a sync message by verifying on the physical layer if the PRBS is included in the message,
   wherein the first timestamp processing unit comprises:
   a PRBS generator configured to generate the PRBS;
   a signature information assigning unit configured to generate signature information including the PRBS and to assigns the signature information to a TLV field indicating type, length and value of the sync message; and a PRBS verifying unit configured to verify on the physical layer if a bitstream received from an upper layer includes the PRBS and, if the bitstream is verified as including the PRBS, to determine the bitstream as the sync message and perform timestamping.

2. The timestamp processing terminal of claim 1, wherein the PRBS generator enters a predetermined input bit in a prime polynomial to generate the PRBS.

3. The timestamp processing terminal of claim 2, wherein the PRBS generator generates the PRBS by performing exclusive-or (XOR) operation on the prime polynomial using a linear feedback shift register (LFSR).

4. The timestamp processing terminal of claim 2, wherein the PRBS generator enters the input bit in the prime polynomial with reference to a mapping table where the input bit and a sequence identifier of a sync message are mapped.

5. The timestamp processing terminal of claim 1, wherein the signature information assigning unit generates the signature information by adding the PRBS following a predetermined input bit.

6. The timestamp processing terminal of claim 1, wherein the PRBS verifying unit verifies the PRBS using a prime polynomial.

7. The timestamp processing terminal of claim 6, wherein the PRBS verifying unit performs exclusive-or (XOR) operation on an LFSR and verifies the PRBS using the XOR result and an output value.

8. The timestamp processing terminal of claim 7, wherein the PRBS verifying unit determines the bitstream as a sync message if bit '0' is consecutively generated a predetermined times as a detected result value upon the verification.

9. The timestamp processing terminal of claim 1, further comprising a post-PRBS verifying unit configured to verify on an upper layer if the PRBS of the signature information is an input bit transmitted from the upper layer to the physical layer.

10. The timestamp processing terminal of claim 1, wherein the second timestamp processing unit comprises:
a PRBS identifier configured to identify if a message received from the terminal is a sync message by verifying on the physical layer if the PRBS is included in the message; and
a synchronizing unit configured to perform synchronization using a timestamp which is stored if the message has been identified as the sync message.

11. The timestamp processing terminal of claim 10, wherein the PRBS identifier identifies the PRBS using a prime polynomial.

12. A timestamp processing method for performing synchronization with another terminal connected to a network, comprising:
generating a pseudo-random binary sequence (PRBS);
assigning signature information to a message, which is to be sent to the terminal, using the PRBS, wherein the signature information is used to identify the message as a sync message; and
verifying the signature information on a physical layer,
wherein assigning the signature information comprises:
generating the signature information by adding the PRBS following a predetermined input bit; and
assigning the signature information to a TLV field indicating type, length and value of the sync message.

13. The timestamp processing method of claim 12, wherein generating the PRBS comprises:
providing a predetermined input bit with reference to a mapping table where the input bit and a sequence identifier of a sync message are mapped; and
generating the PRBS by performing exclusive-or (XOR) operation on prime polynomials on the basis of the input bit.

14. The timestamp processing method of claim 12, wherein verifying the signature information comprises verifying through a prime polynomial on the physical layer if a bitstream received from an upper layer includes the PRBS and, if the bitstream is verified as including the PRBS, determining the bitstream as the sync message.

15. The timestamp processing method of claim 12, further comprising:
verifying on an upper layer if the PRBS of the signature information is an input bit transmitted from the upper layer to the physical layer; and
if the PRBS is verified as the input bit, providing a sync message including a sequence identifier mapped to the input bit to the terminal.

* * * * *